(12) United States Patent
Nakamura et al.

(10) Patent No.: US 8,242,650 B2
(45) Date of Patent: Aug. 14, 2012

(54) VIBRATION MOTOR

(75) Inventors: Hideaki Nakamura, Itabashi-ku (JP); Eisuke Oshima, Ota-ku (JP)

(73) Assignee: Nidec Copal Corporation, Tokyo (JP)

( * ) Notice: Subject to any disclaimer, the term of this patent is extended or adjusted under 35 U.S.C. 154(b) by 164 days.

(21) Appl. No.: 12/989,789

(22) PCT Filed: Apr. 30, 2009

(86) PCT No.: PCT/JP2009/058522
§ 371 (c)(1),
(2), (4) Date: Oct. 26, 2010

(87) PCT Pub. No.: WO2009/133941
PCT Pub. Date: Nov. 5, 2009

(65) Prior Publication Data
US 2011/0043061 A1    Feb. 24, 2011

(30) Foreign Application Priority Data

Apr. 30, 2008  (JP) ................. 2008-119007

(51) Int. Cl.
*H02K 7/075* (2006.01)
*B06B 1/04* (2006.01)
(52) U.S. Cl. ................. 310/81; 310/216.117
(58) Field of Classification Search ............ 310/81, 310/51, 216.117
See application file for complete search history.

(56) References Cited

U.S. PATENT DOCUMENTS

| | | | |
|---|---|---|---|
| 6,661,138 B2 * | 12/2003 | Osawa et al. | 310/81 |
| 2002/0064295 A1 | 5/2002 | Kobayashi et al. | |
| 2002/0074877 A1 * | 6/2002 | Lee et al. | 310/81 |
| 2008/0150380 A1 * | 6/2008 | Hsiao et al. | 310/81 |
| 2008/0157611 A1 * | 7/2008 | Ki | 310/81 |

FOREIGN PATENT DOCUMENTS

| | | |
|---|---|---|
| JP | 2002-159916 | 6/2002 |
| JP | 2002-282786 | 10/2002 |
| JP | 2003-164804 | 6/2003 |
| JP | 2003-181379 | 7/2003 |
| JP | 2003181379 A * | 7/2003 |

OTHER PUBLICATIONS

Search Report dated Jun. 2, 2009 for International Application No. PCT/JP2009/058522.

* cited by examiner

*Primary Examiner* — Quyen Leung
*Assistant Examiner* — Naishadh Desai
(74) *Attorney, Agent, or Firm* — Beyer Law Group LLP (57) ABSTRACT

A weight used in a vibration motor includes first and second weight parts that extend along adjacent wing parts to hold the wing parts therebetween; an insertion part that is formed between the first and second weight parts and into which the adjacent wing parts are inserted in the radial direction of the core; and a third weight part that is inserted between the adjacent wing parts (that is, slot) and connects the first weight part and the second weight part in a direction of the rotation axis line such that the insertion part is decoupled.

9 Claims, 15 Drawing Sheets

VIBRATION MOTOR

TECHNICAL FIELD

The invention relates to a vibration motor that is contained in various portable communication terminals (for example, portable telephone), portable information terminal devices, gaming devices and the like and is thus used as a vibration generation source of a paging function.

BACKGROUND ART

Conventionally, as an art of this field, there is JP-A No. 2003-181379. A vibration motor disclosed in the publication includes a core having coils wound on coil parts and a weight disposed between the coil parts. The weight has weight pieces having a fan-shape, which are decoupled from above and below. The upper weight piece is inserted between the coils from above and the lower weight piece is inserted between the coils from below and the upper and lower weight pieces are then connected by a rivet. In addition, the weight is covered by a cover member made of an electrically insulating material, so that insulation inferiority between the coils and the core is prevented.

SUMMARY OF THE INVENTION

Problems to be Solved

However, the upper weight piece is inserted between the coils from above and the lower weight piece is inserted between the coils from below. After that, it is required to connect the upper and lower weight pieces by the rivet under state that wing parts extending in a circumferential direction at end portions of the coil parts are held between the upper and lower weight pieces. Thus, an assembly configuration of the weight is complicated, so that an assembling operability is poor. Furthermore, even when the weight is made to be small so as to miniaturize the vibration motor, it is not possible to make the rivet smaller than needs, so as to secure fixing force necessary for the connection of the upper and lower weight pieces. Thereby, an occupying ratio of the rivet of soft material relative to a volume of the weight made of tungsten becomes larger, so that it is difficult to secure a mass of the weight and a vibration amount of the motor is thus lowered.

An object of the invention is to provide a vibration motor having a favorable assembling operability of a weight to a core and suitable for miniaturization.

Means for Solving the Problems

A vibration motor according to the invention includes:
a core that includes a plurality of salient poles radially protruding from a center part thereof and rotates about a rotation axis line, each of the salient poles including a coil part on which a coil is wound and a wing part extending from an portion of the coil part in a circumferential direction; and
a weight that is fixed to the salient pole,
wherein the weight includes:
first and second weight parts that extend along the wing parts to hold the adjacent wing parts therebetween;
an insertion part that is formed between the first and second weight parts and into which the adjacent wing parts are inserted in the radial direction of the core; and
a third weight part that is inserted between the adjacent wing parts and connects the first weight part and the second weight part in a direction of the rotation axis line such that the insertion part is decoupled.

The weight used in the vibration motor is inserted in the radial direction of the core and is thus mounted to the core. In other words, with the first and second weight parts serving as guides, the respective wing parts of the core are inserted in the insertion part of the weight, so that the assembling operability of the weight to the core is very good. Through the insertion operation, the third weight part, which configures a part of the weight, is disposed between the salient poles at which the motor is enabled to easily generate a vibration, so that it is possible to secure the high vibration of the motor. Furthermore, since the first and second weight parts extend along the wing parts, the portions of the first and second weight parts above the wing parts are also enabled to effectively contribute to the vibration. Therefore, even when a diameter of the core is made to be small due to the miniaturization of the motor, it is possible to secure the mass of the weight at the corresponding portions, so that it is possible to suppress the lowering of the vibration amount of the motor due to the miniaturization of the motor.

It is preferable that the weight includes an engagement part that connects the first weight part to the second weight part and is inserted into a recess part formed on a peripheral surface of the wing part.

When the weight is mounted to the core, the engagement parts of the weight are contacted to the wall surfaces of the recess pars of the wing parts, so that the weight can be easily positioned. Since the engagement parts configure a part of the weight, it can be enabled to contribute the vibration of the motor.

It is preferable that the weight includes first and second clamping parts that are adjacent to the third weight part and protrude between the salient poles from the first and second weight parts.

The weight can be enabled not to easily fall out in the direction of the rotation axis line by pressing the first and second clamping parts in the direction of the rotation axis line so that the first and second clamping parts become close to each other. By the clamping operation, it is possible to fix the weight to the core simply and securely. In addition, since it is not necessary to perform a laser welding adjacent to the coils, it is possible to prevent the coils from breaking down due to laser. Further, since the first and second clamping parts, which configure a part of the weight, are disposed between the salient poles at which the motor is enabled to easily generate a vibration, it is possible to enable the third weight part and the engagement parts to contribute to the high vibration of the motor.

It is preferable that the pair of first clamping parts are integrated with the third weight part to hold the third weight part from both sides of the third weight part and the pair of second clamping parts are opposed to the first clamping parts and spaced from the third weight part.

Since the second clamping parts are spaced from the third weight part, the second clamping parts are easily bent by the clamping operation. Accordingly, it is possible to easily apply the clamping operation to the weight made of hard material such as tungsten, and the weight is little fractured or damaged during the clamping operation.

It is preferably that a riser part extending in a radial direction is inserted between the second clamping parts.

The riser part extends in the radial direction of the core, so that the motor can be made to be flat. In addition, it is possible to extend the third weight part in the radial direction of the core without being disturbed by the riser part and to thus increase the mass of the weight parts.

Effects of the Invention

According to the invention, the assembling operability of the weight to the core is good and the vibration motor can be easily miniaturized.

DETAILED DESCRIPTIONS OF EXEMPLARY EMBODIMENTS

Hereinafter, a vibration motor according to a preferred illustrative embodiment of the invention will be specifically described with reference to the drawings.

Figure 1:
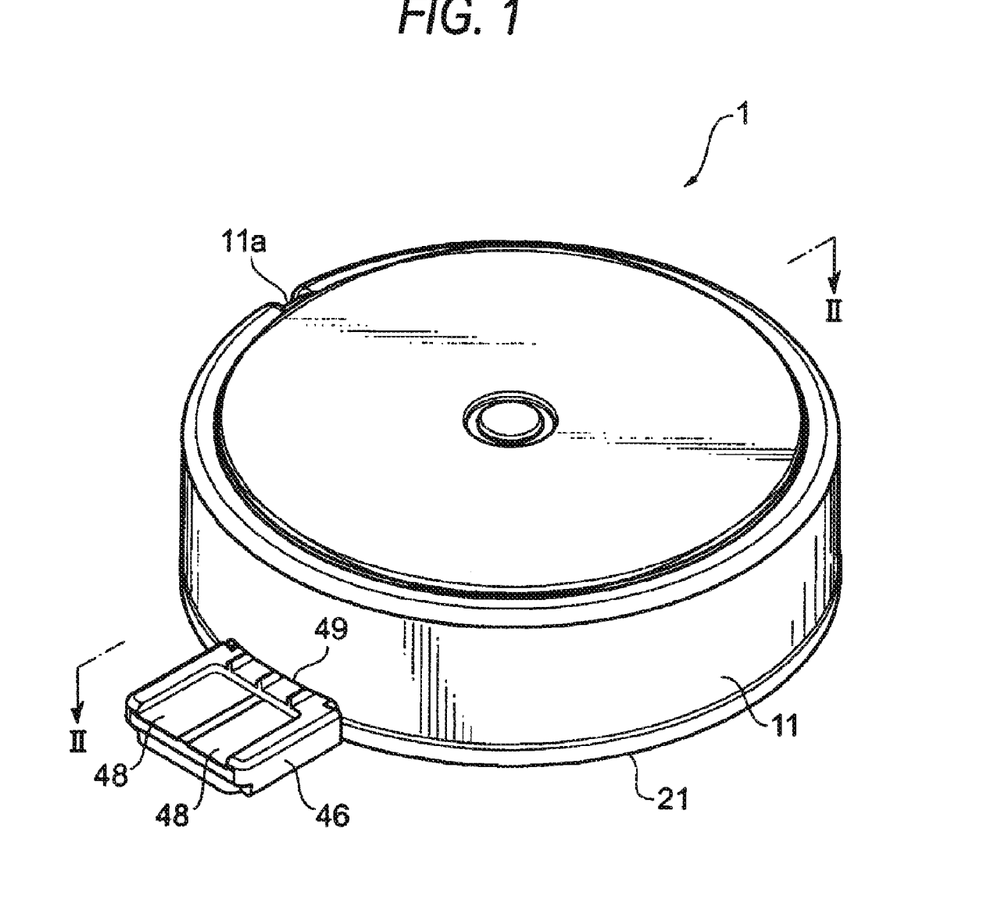
FIG. 1 is a perspective view of a vibration motor according to an illustrative embodiment of the invention.
Figure 2:
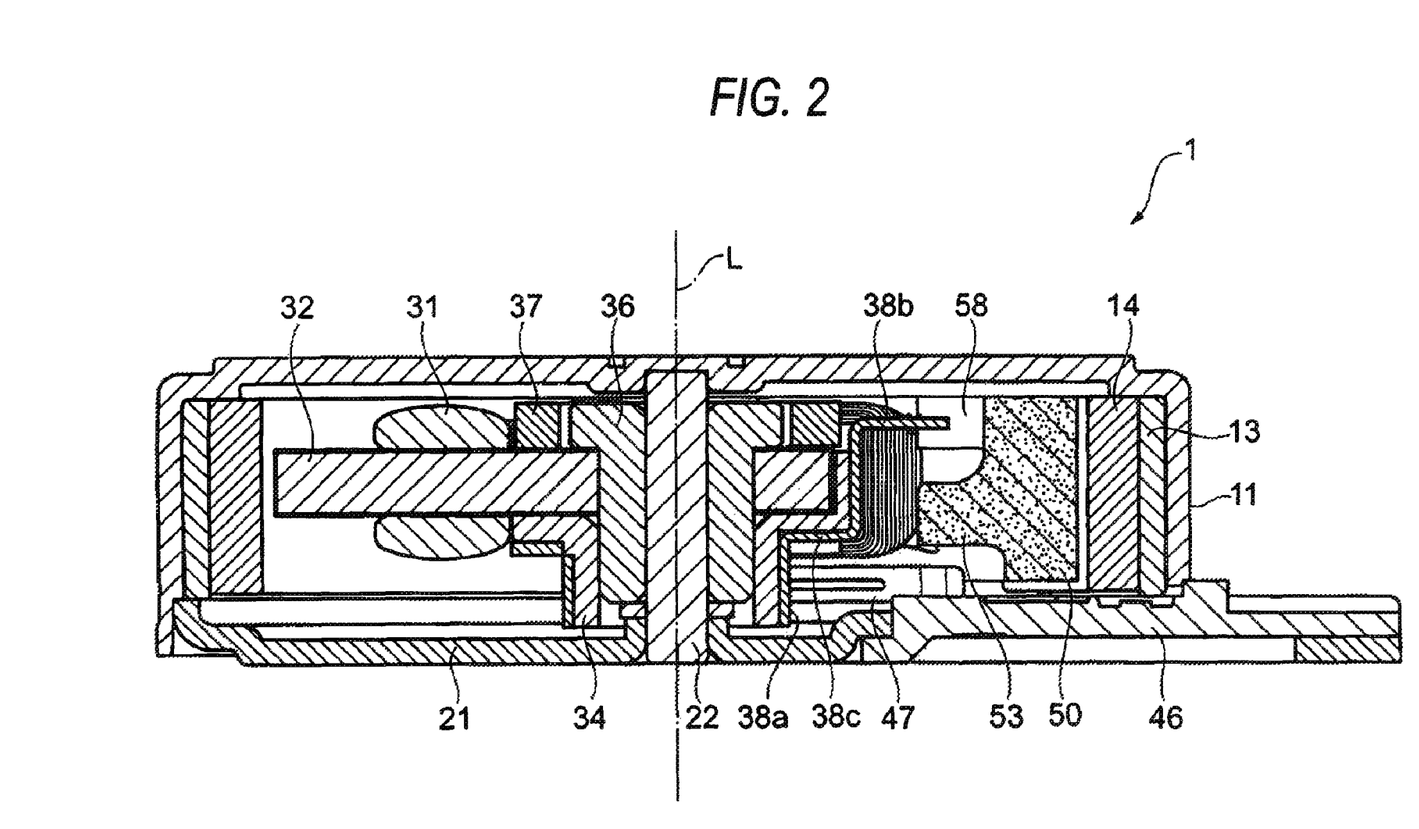
FIG. 2 is a sectional view taken along a line II-II of FIG. 1.
Figure 3:
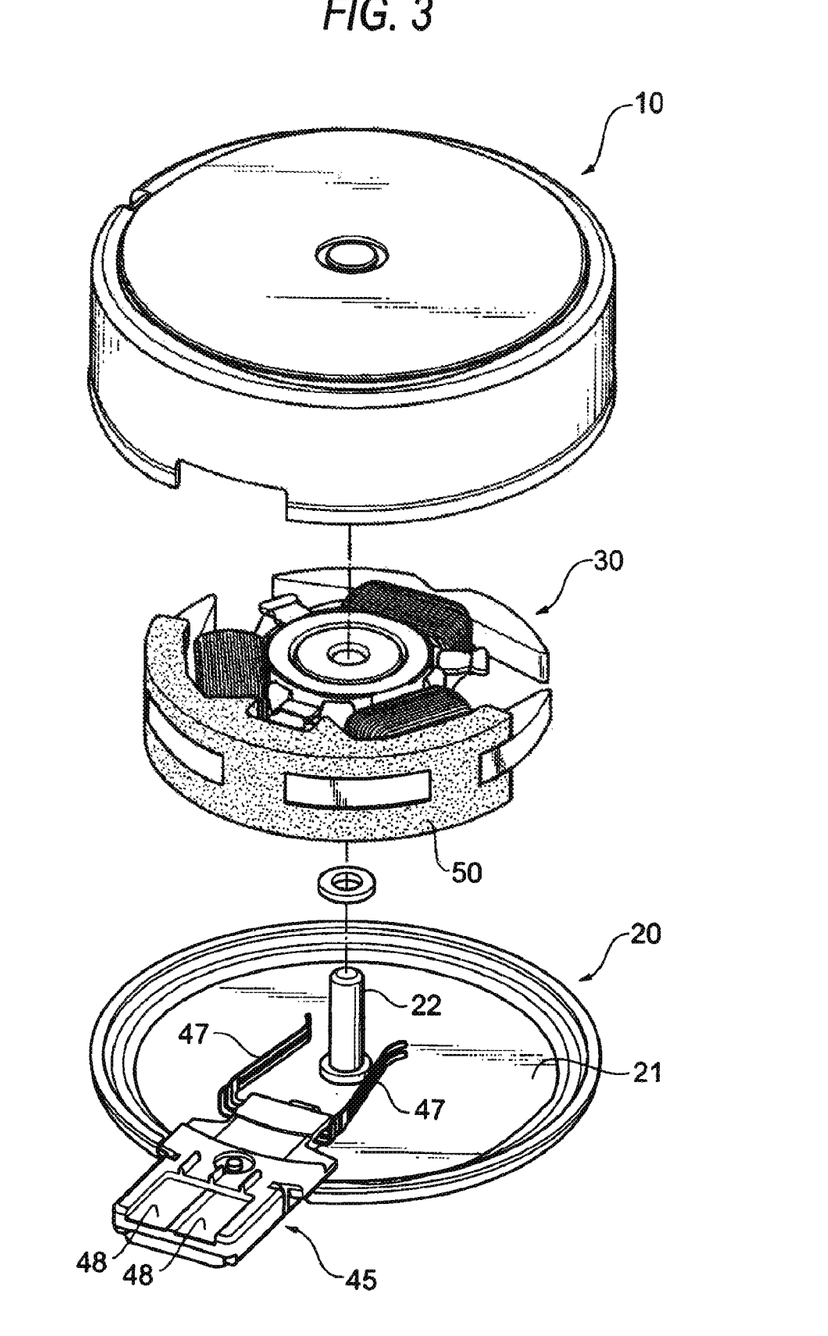
FIG. 3 is an exploded perspective view of a vibration motor according to an illustrative embodiment of the invention.

As shown in FIGS. 1 to 3, a small vibration motor 1 is embedded in a portable communication device (for example, portable telephone), is used as a vibration generation source of a paging function and has a coin shape having a diameter of about 10 mm and a thickness of about 3 mm In order to easily assemble, the vibration motor includes an upper case assembly 10 that configures a stator, a lower case assembly 20 that configures a base of the motor 1, a rotor assembly 30 that configures a rotor, a brush assembly 45 that enables power supply and a weight 50 that is made of metal having a high specific gravity (for example, tungsten).

Figure 4:
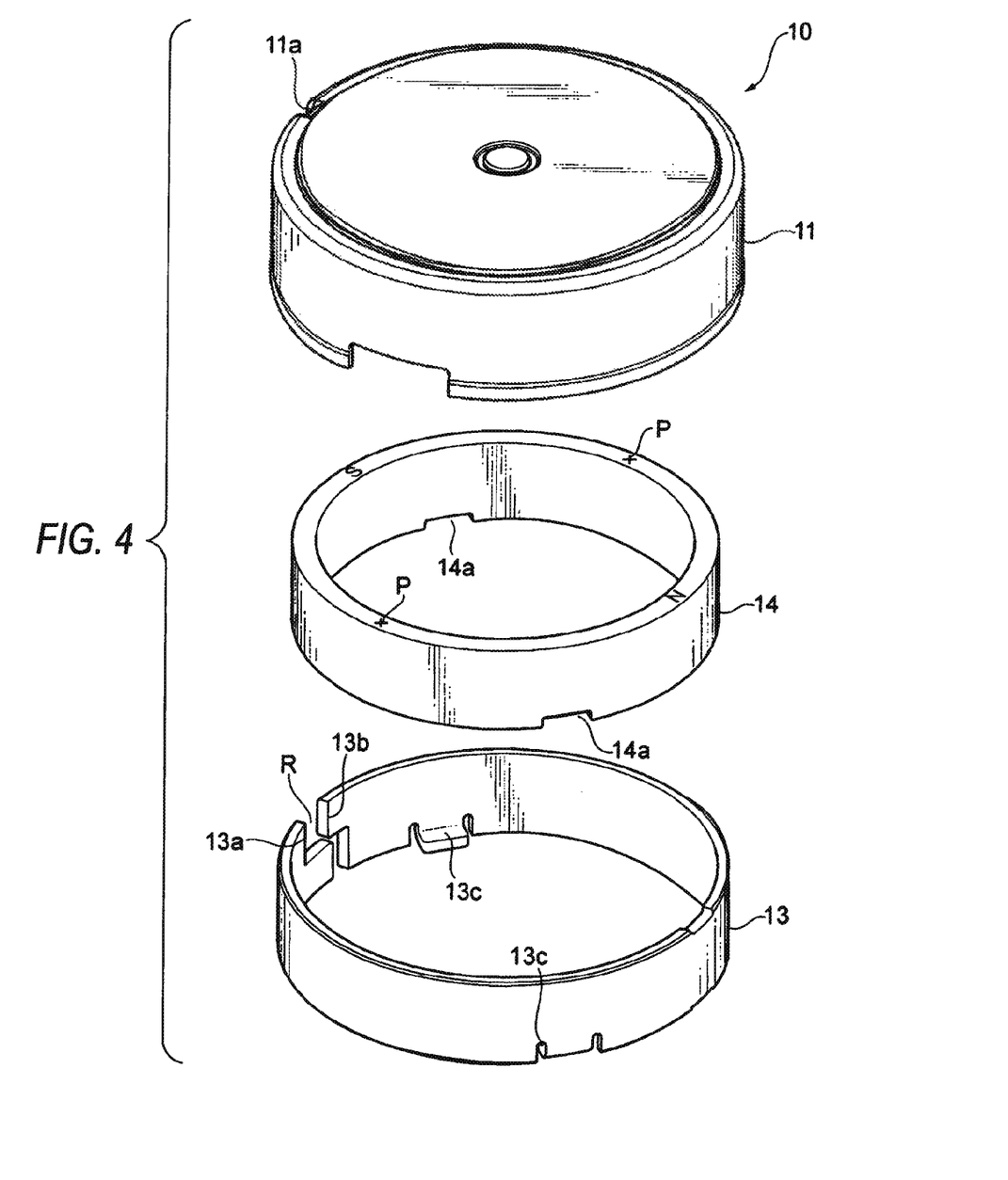
FIG. 4 is an exploded perspective view showing an upper case assembly.

As shown in FIGS. 3 and 4, the upper case assembly 10 has a cup-shaped upper case 11 that is made of non-magnetic material (for example, stainless), a C ring-shaped back yoke 13 that is fixed on an inner wall surface of the upper case 11 by adhesive and is made of soft magnetic material and an O ring-shaped magnet 14 that is fixed on an inner wall surface of the back yoke 13 by adhesive.

The back yoke 13 has a spaced part R between both end portions 13a, 13b thereof. The spaced part R is disposed at a position (central position of an S pole) of 90° from magnetic walls P of the magnet 14, so that a magnetic circuit can be effectively prepared. In the meantime, the magnetic wall P means a boundary of N and S poles of the magnet 14.

The back yoke 13 has a pair of tab pieces 13c, which protrude from a lower end of the back yoke in a radial direction. The magnet 14 has a pair of notch parts 14a into which the respective tab pieces 13c are inserted. When the tab pieces 13c of the back yoke 13 are inserted into the notch parts 14a of the magnet 14, the precise positioning of the magnet 14 to the back yoke 13 is achieved.

Further, the back yoke 13 includes a convex part 11a that is inwardly protruded by processing a part of a peripheral edge of an upper side of the upper case 11 into a recess shape. When the convex part 11a is inserted into the spaced part R of the back yoke 13, the positioning of the back yoke 13 to the upper case 11 is achieved.

Figure 5:
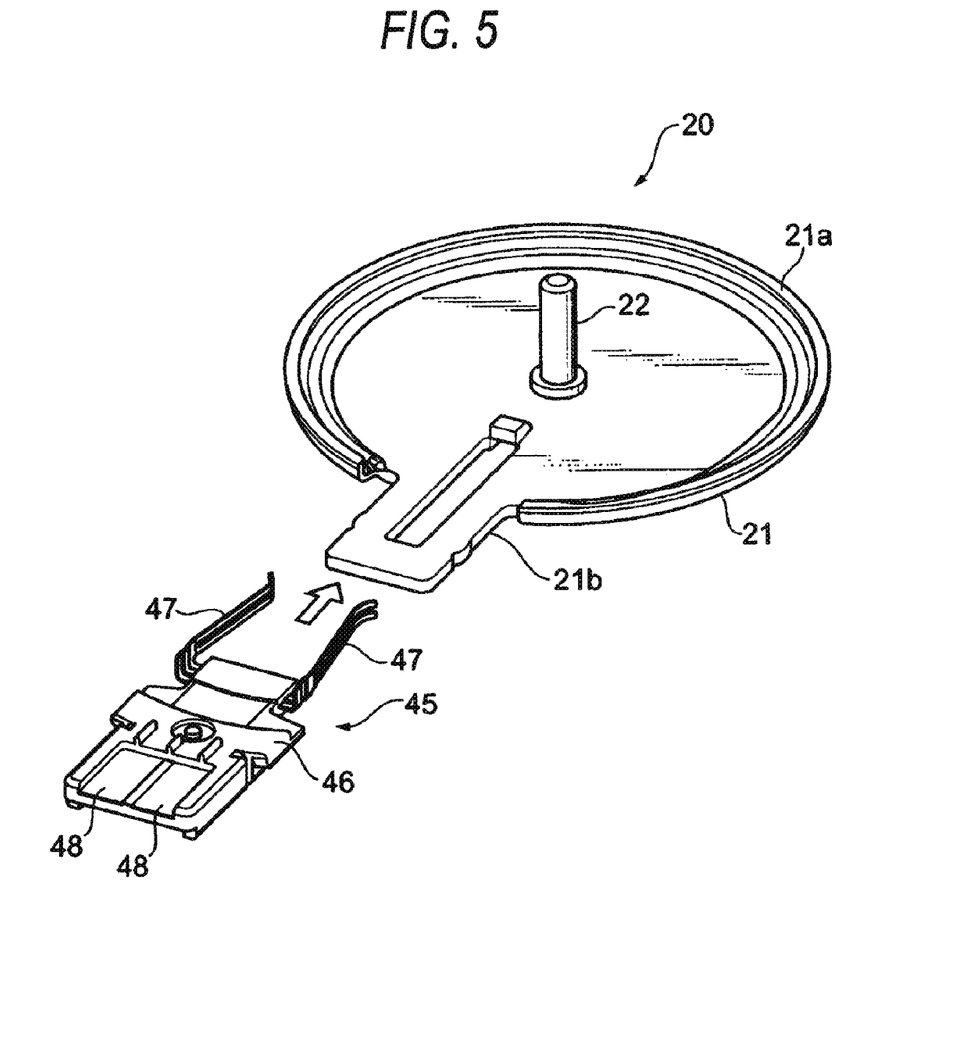
FIG. 5 is an exploded perspective view showing a lower case assembly.

As shown in FIG. 5, the lower case assembly 20 includes a dish-shaped lower case 21 that is bonded to the upper case 11 by a laser welding and is made of non-magnetic material (for example, stainless) and a shaft 22 that is fixed at a center of the lower case 21. The lower case 21 includes a protrusion 21b that extends from a main body part 21a of a dish shape in a radial direction. Furthermore, a brush assembly 25 is fixed to the lower case 21 and is disposed on the protrusion 21b.

Figure 6:
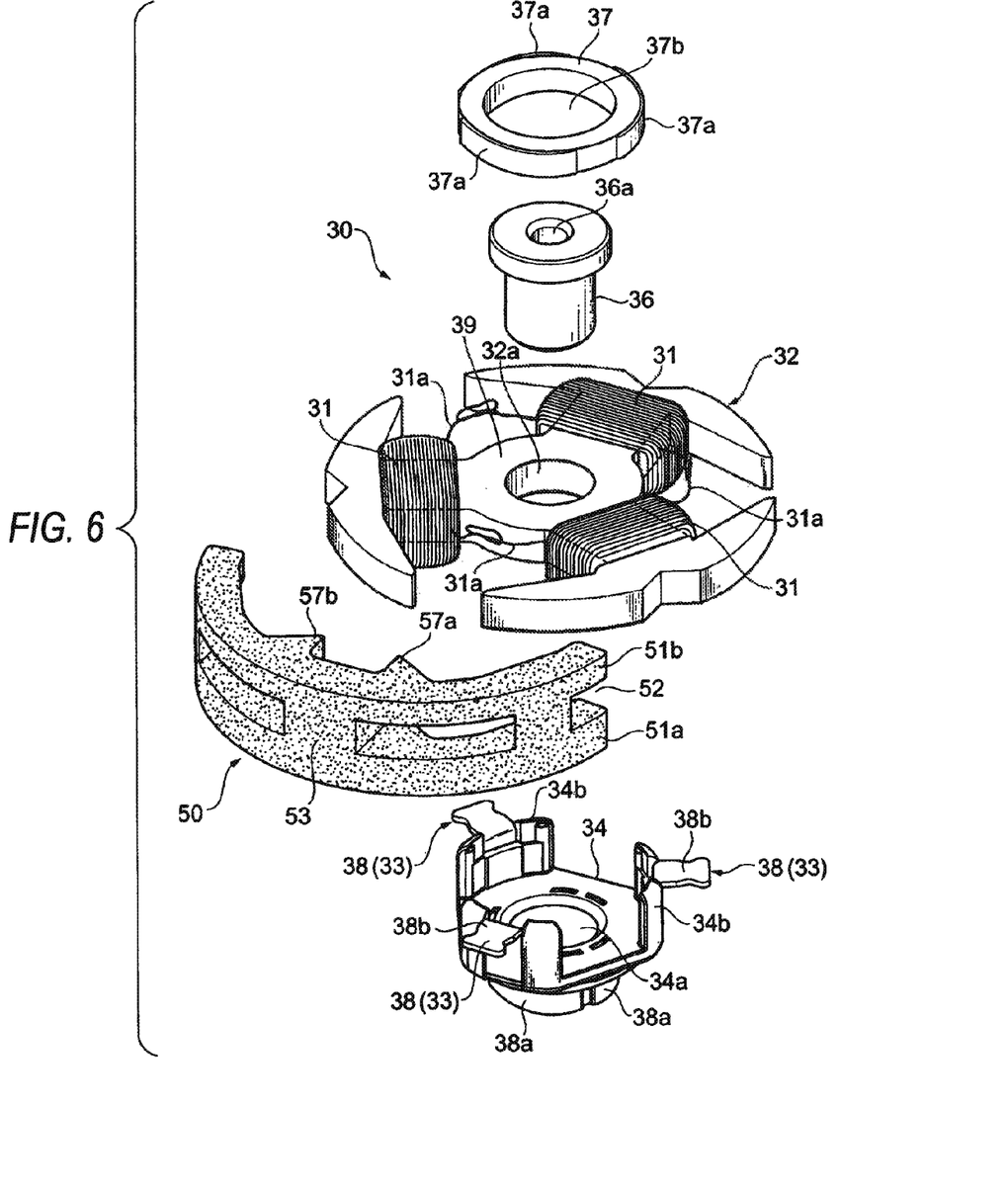
FIG. 6 is an exploded perspective view showing a rotor assembly and a weight.
Figure 7:
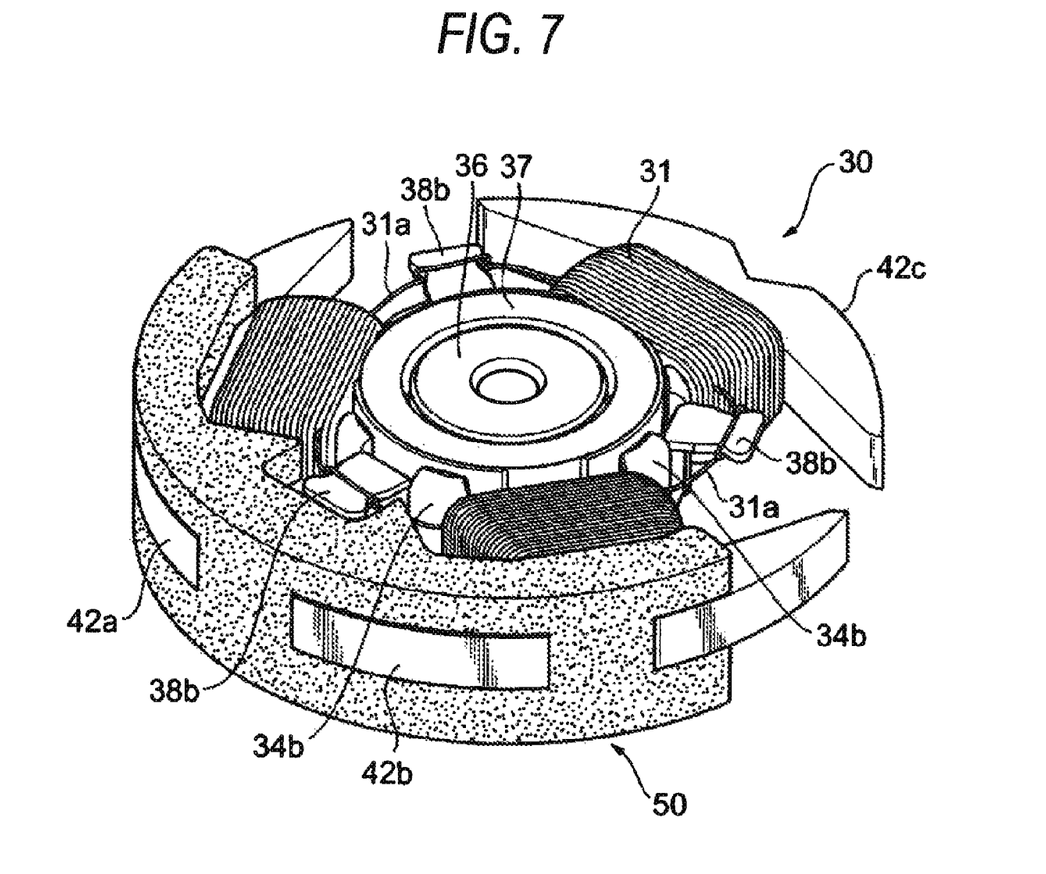
FIG. 7 is a perspective view showing the rotor assembly and the weight.
Figure 8:
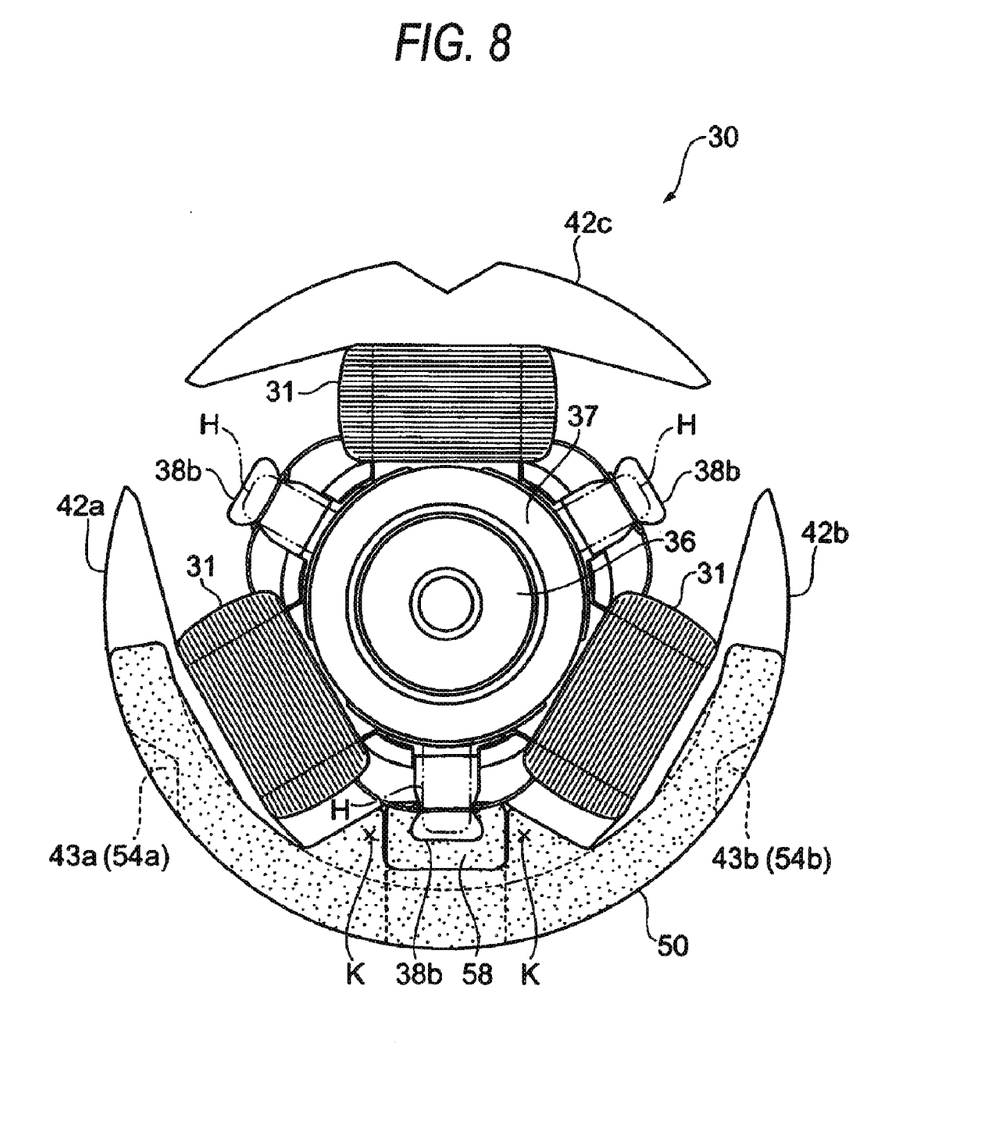
FIG. 8 is a plan view showing the rotor assembly and the weight.

As shown in FIGS. 6 to 8, the rotor assembly 30 that is rotatably supported to the shaft 22 includes coils 31, a core 32 on which the coils 31 are wound, a commutator 33 that supplies current to the coils 31, a cummutator holder 34 that holds the commutator 33, a cylindrical bearing 36 that is press-inserted into a center hole 32a of the core 32 and has an axis hole 36a into which the shaft 22 is inserted, and a varistor 37 that prevents spark and noise.

The vibration motor 1 is a two-pole three-slot type and the core 32 is prepared by stacking three punched silicon steel plates having a thickness of 0.2 mm The commutator 33 has three commutator segments 38 that are prepared by press forming a copper thin plate. Each commutator segment 38 includes a brush slide-contact part 38a having a circular arc sectional shape and extending along a rotation axis line L, a riser part 38b to which the coil 31 is connected to and which extends in a radial direction of the core 32 and protrudes into a slot and a L-shaped connection part 38c that connects the brush slide-contact part 38a and the riser part 38b (refer to FIG. 2). In the meantime, the core 32 may be a single plate.

The three commutator segments 38 are assembled to the commutator holder 34 by an insert formation, for example, so that a commutator assembly is configured. The commutator assembly is integrated with the core 32 by press inserting the bearing 36 into the center hole 34a of the commutator holder 34.

The ring-shaped varistor 37 is held between respective standing parts 34b provided at a peripheral edge of the commutator holder 34 and a top part of the bearing 36 is inserted into the center hole 37b of the varistor 37. After the core 32 and the varisotr 37 are fixed by doing so, wires 31a of the coils 31 are wound on leading ends of the riser parts 38b and the respective wires 31a, the riser parts 38b and respective electrodes 37a of the varistor 37 are electrically connected by a soldering H.

As shown in FIG. 5, the brush assembly 45 includes: a plate-shaped main body part 46 that can be attached to the lower case 21; a pair of brush pieces 47, which protrude from the main body part 46 and contact the brush slide-contact parts 38a of the respective commutator segments 38; and a pair of terminals 48, which are exposed from the upper case 11 at an end portion of the main body part 46. The brush pieces 47 and the terminals 48 are connected to each other in the main body part 46. After the shaft 22 is inserted into the axis hole 36a of the bearing 36 of the rotor assembly 30, the brush assembly 45 is radially mounted to the lower case 21 and a part thereof is exposed in the radial direction from a rectangular opening 49 (refer to FIG. 1) that appears by combining the upper case 11 and the lower case 21.

As shown in FIGS. 8 to 12, the weight 50 is fixed to the core 32. The core 32 has a ring-shaped center part 39 (refer to FIG. 6) having the center hole 32a into which the bearing 36 is press inserted and salient poles 40a, 40b, 40c that radially protrude from the center part 39. The respective salient poles 40a, 40b, 40c, which are arranged at an equal interval, have coil parts 41a, 41b, 41c on which the coils 31 are wound and wing parts 42a, 42b, 42c that circumferentially extend from end portions of the coil parts 41a, 41b, 41c.

Figure 10:
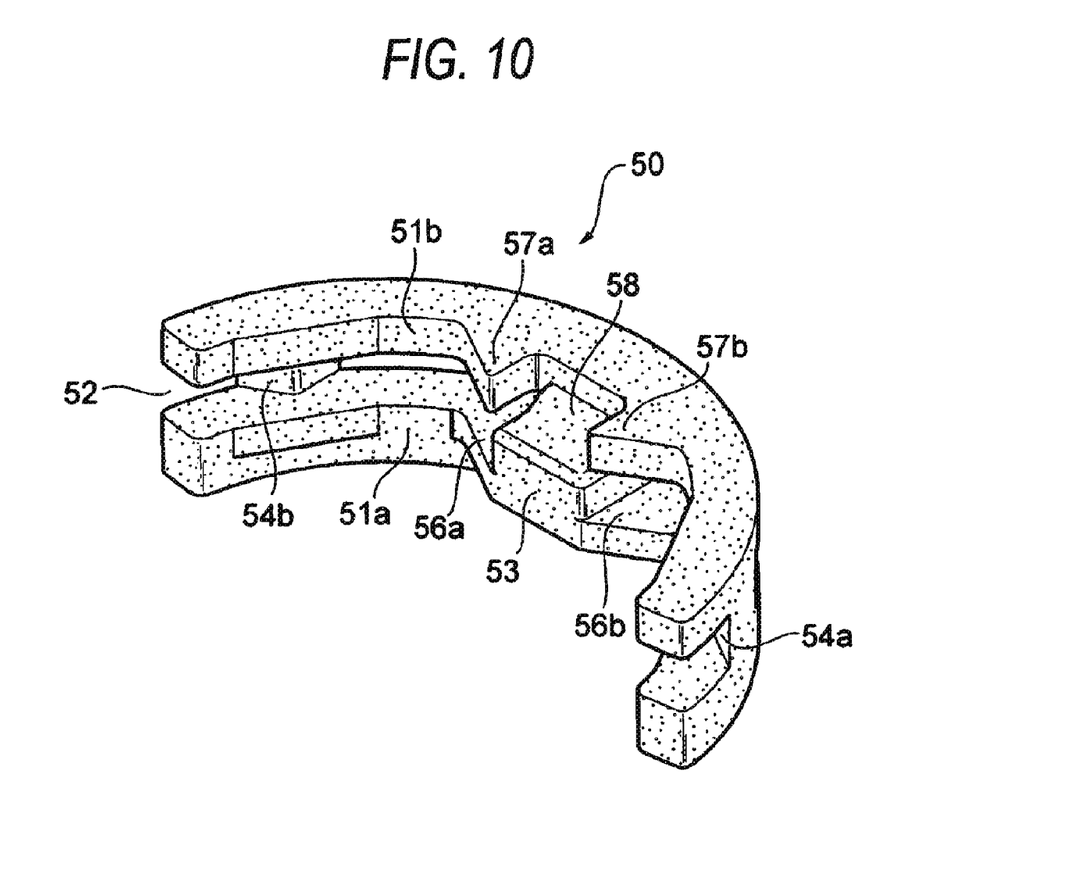
FIG. 10 is a perspective view showing a weight that is applied to a vibration motor according to an illustrative embodiment of the invention.
Figure 11:
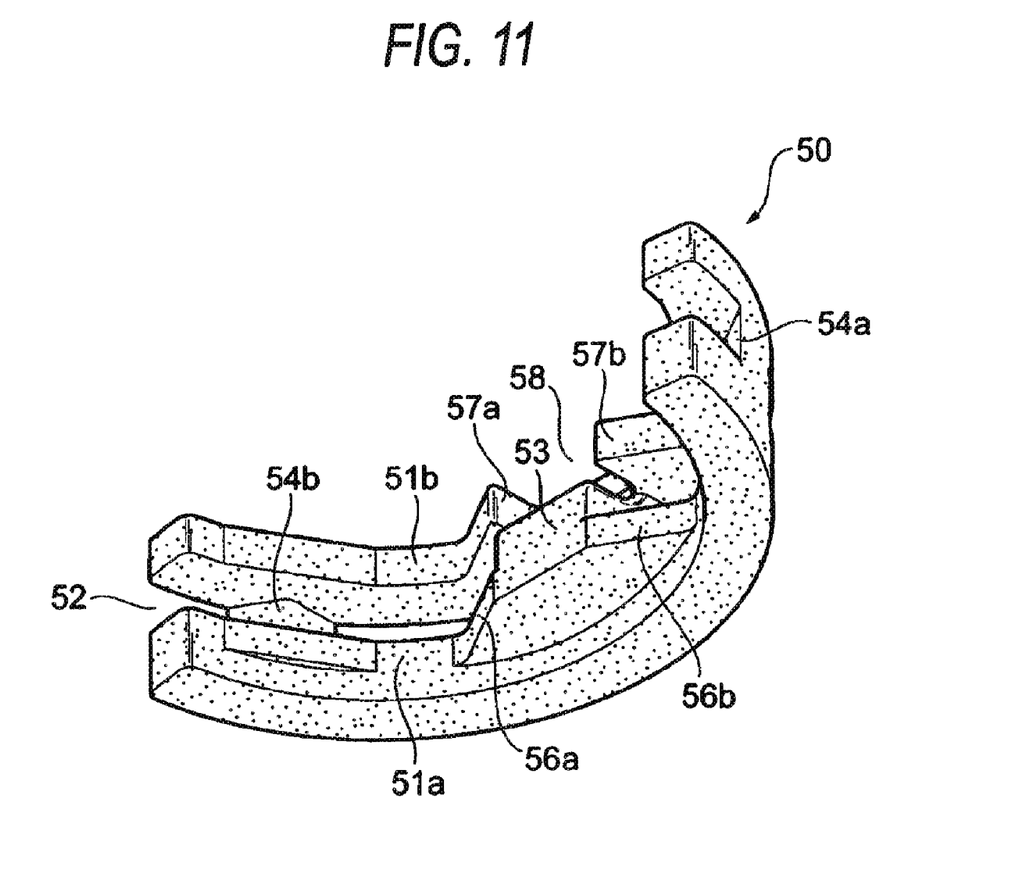
FIG. 11 is a perspective view of the weight seen from another direction.
Figure 12:
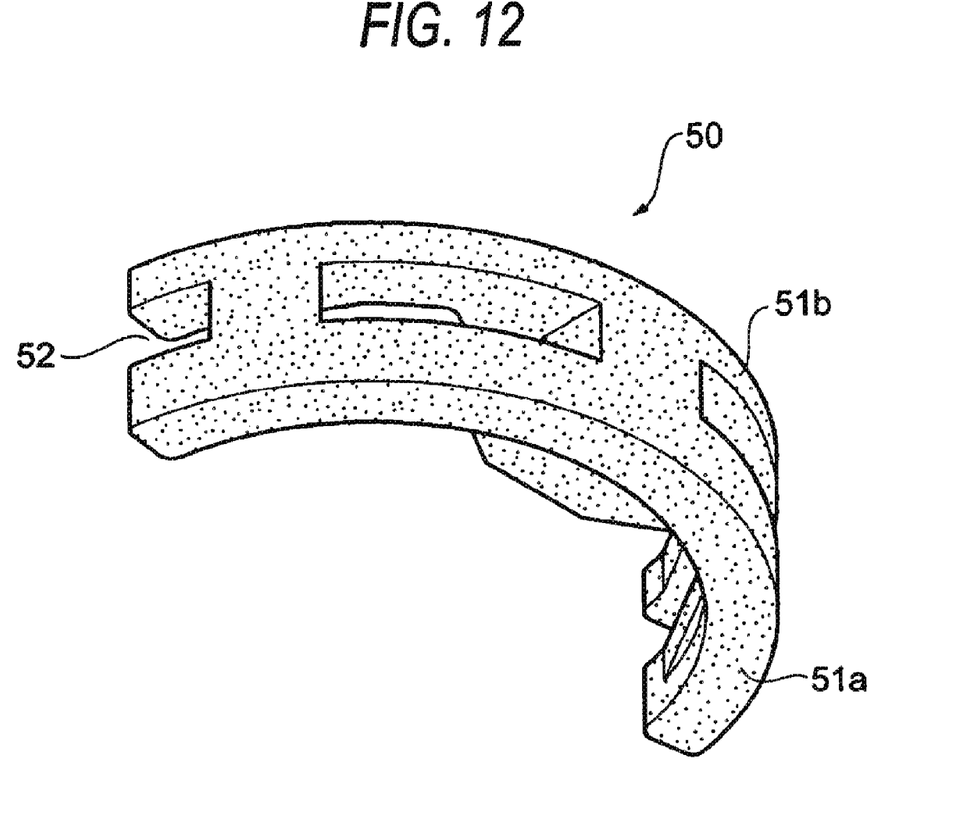
FIG. 12 is a perspective view of the weight seen from still another direction.

The weight 50 includes: first and second weight parts 51a, 51b that extend along the wing parts 42a, 42b to hold the adjacent wing parts 42a, 42b from above and below; a slit-shaped insertion part 52 that extends between the first weight part 51a and the second weight part 51b and enables insertion of the adjacent wing parts 42a, 42b; and a third weight part 53 that is inserted between the adjacent wing parts 42a, 42b (i.e., into a slot) and connects the first weight part 51a and the second weight part 51b in the direction of the rotation axis line L such that the insertion part 52 is decoupled into left and right.

The third weight part 53 has a width that is approximately equivalent to a distance B between an end of the wing part 42a and an end of the wing part 42b. Thus, it is possible to restrain the third weight part 53 from rattling in the left and right direction (circumferential direction) by the wing parts 42a, 42b.

Figure 9:
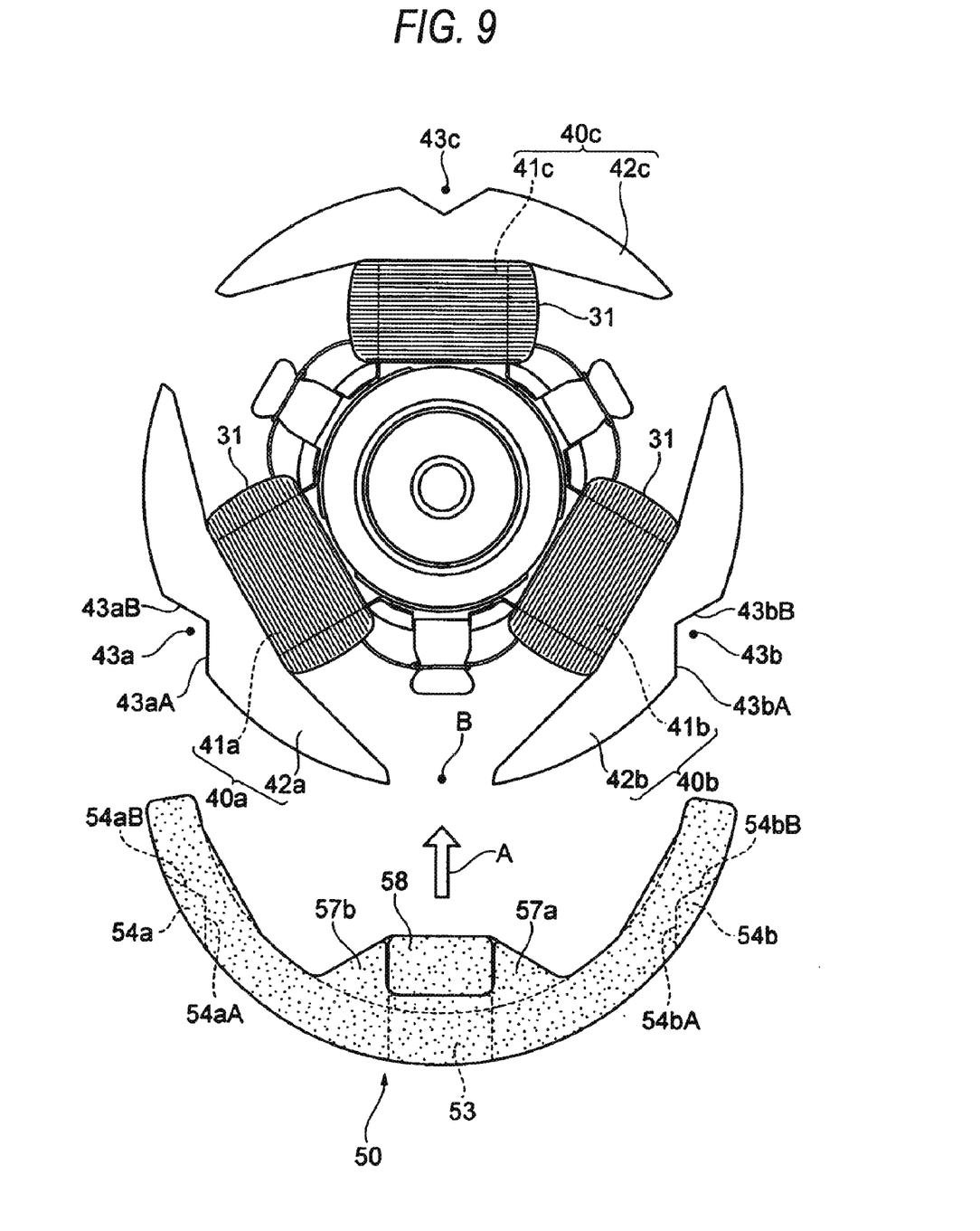
FIG. 9 is a plan view showing a state before the weight is assembled to the rotor assembly.

The weight 50 is mounted to the core 32 so that it is radially inserted. At this time, since the respective wing parts 42a, 42b of the core 32 are inserted in the insertion part 52 of the weight 50 with the aid of the first and second weight parts 51a, 51b extending in parallel above and below and serving as guides, the assembling operability of the weight 50 to the core 32 is very good. Through the insertion operation, the third weight part 53, which configures a part of the weight 50, is disposed between the salient pole 40a and the salient pole 40b (i.e., in a slot) at which the motor 1 is enabled to easily generate a vibration, so that it is possible to secure the high vibration of the motor 1.

Furthermore, since the first and second weight parts 51a, 51b extend along the wing parts 42a, 42b, the portions of the first and second weight parts 51a, 51b above the wing parts 42a, 42b are also enabled to effectively contribute to the vibration. Therefore, even when a diameter of the core 32 is made to be small due to the miniaturization of the motor 1, it is possible to secure the mass of the weight 50 at that portions, so that it is possible to suppress the lowering of the vibration amount of the motor 1 due to the miniaturization of the motor 1.

In order to further favor the assembling operability of the weight 50 to the core 32, the wing parts 42a, 42b are formed at peripheral surfaces of outer diameter parts thereof with recess parts 43a, 43b and the weight 50 is provided with engagement parts 54a, 54b that connect the first weight part 51a and the second weight part 51b and are inserted and fitted in the recess parts 43a, 43b of the wing parts 42a, 42b.

The recess parts 43a, 43b and the engagement parts 54a, 54b form triangle shapes each other and are closely contacted. In addition, as shown in FIG. 9, one wall surface 43aA of two wall surfaces of the recess part 43a extends in the approximately same direction as a mounting direction A and one wall surface 43bA of two wall surfaces of the recess part 43b extends in the approximately same direction as the mounting direction A. Likewise, one wall surface 54aA of two wall surfaces of the engagement part 54a extends in the approximately same direction as an insertion direction A and one wall surface 54bA of two wall surfaces of the engagement part 54b extends in the approximately same direction as the insertion direction A.

Thereby, when mounting the weight 50, it is possible to insert the engagement parts 54a, 54b into the recess parts 43a, 43b simply and securely. Accordingly, other wall surfaces 54aB, 54bB of the engagement parts 54a, 54b of the weight 50 contact other wall surfaces 43aB, 43bB of the recess parts 43a, 43b, respectively. As a result, the positioning of the weight 50 at an inner side of the insertion direction (mounting direction) can be achieved easily and securely. Furthermore, since the engagement parts 54a, 54b configure a part of the weight 50, they can be enabled to contribute the vibration of the motor 1.

In order to further favor the assembling operability of the weight 50 to the core 32, the weight 50 is provided with a pair of first clamping parts 56a, 56b and a pair of second clamping parts 57a, 57b. The respective clamping parts 56a, 5bb, 57a, 57b configure pairs also in the direction of the rotation axis line L, are adjacent to the third weight part 53 having a rectangular block shape and protrude between the salient poles 40a, 40b beyond the wing parts 42a, 42b from the first and second weight parts 51a, 51b.

By supporting the first clamping parts 56a, 56b positioned below by a support and the like and pressing hitting points K (refer to FIG. 8) of the second clamping parts 57a, 57b from above, the first and second clamping parts 56a, 56b, 57a, 57b are clamped in the direction of the rotation axis line L so that the first clamping parts 56a, 56b and the second clamping parts 57a, 57b become close to each other. As a result, the weight 50 can be enabled not to easily fall out in the direction of the rotation axis line L. In addition, by the clamping operation, it is possible to fix the weight 50 to the core 32 simply and securely.

Further, since it is not necessary to perform a laser welding adjacent to the coils 31, it is possible to prevent the coils 31 from breaking down due to laser. Since the first and second clamping parts 56a, 56b, 57a, 57b, which configure a part of the weight 50, are disposed between the salient poles 40a, 40b at which the motor is enabled to easily generate a vibration, the respective clamping parts 56a, 56b, 57a, 57b contribute to the high vibration of the motor 1 together with the third weight part 53.

Furthermore, the pair of first clamping parts 56a, 56b forming a triangle shape are integrated with the third weight part 53 so that they hold the third weight part 53 therebetween. To the contrary, the second clamping parts 57a, 57b forming a triangle shape are opposed to the first clamping parts 56a, 56b and are spaced from the third weight part 53.

Therefore, since the second clamping parts 57a, 57b are spaced from the third weight part 53, the second clamping parts 57a, 57b are easily bent by a clamping operation. Accordingly, it is possible to easily apply the clamping operation to the weight 50 made of hard material such as tungsten, and the weight 50 is little fractured or damaged during the clamping operation.

Furthermore, a recess part 58 is formed above the third weight 53 between the second clamping parts 57a, 57b and the riser part 38b extending in the radial direction is inserted into the recess part 58. The riser part 38b extends in the radial direction of the core 32, so that the motor 1 can be made to be flat. In addition, it is possible to extend the third weight part 53 in the radial direction of the core 32 without being disturbed by the riser part 38b and to thus increase the mass of the weight 50.

As shown in FIGS. 8 and 9, the wing part 42c of another salient pole 41c also has a recess part 43c forming the same shape as the salient poles 40a, 40b. Thereby, the weight 50 can be mounted to any salient pole 40a, 40b, 40c, so that the assembling operability of the weight 50 to the core 32 is highly favored.

It should be noted that the invention is not limited to the illustrative embodiments. For example, the weight 50 may be fixed to the core by a laser welding or a combination of the clamping and the welding.

Figure 13:
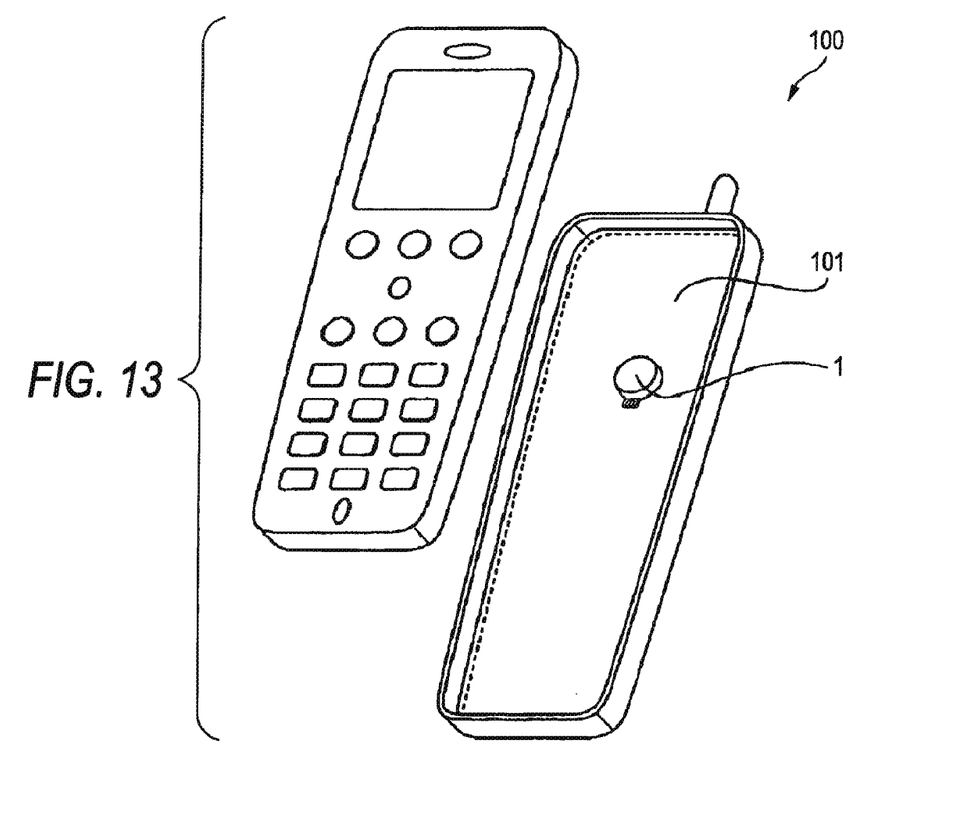
FIG. 13 is a perspective view showing a portable telephone having mounted a vibration motor according to an illustrative embodiment of the invention.
Figure 14:
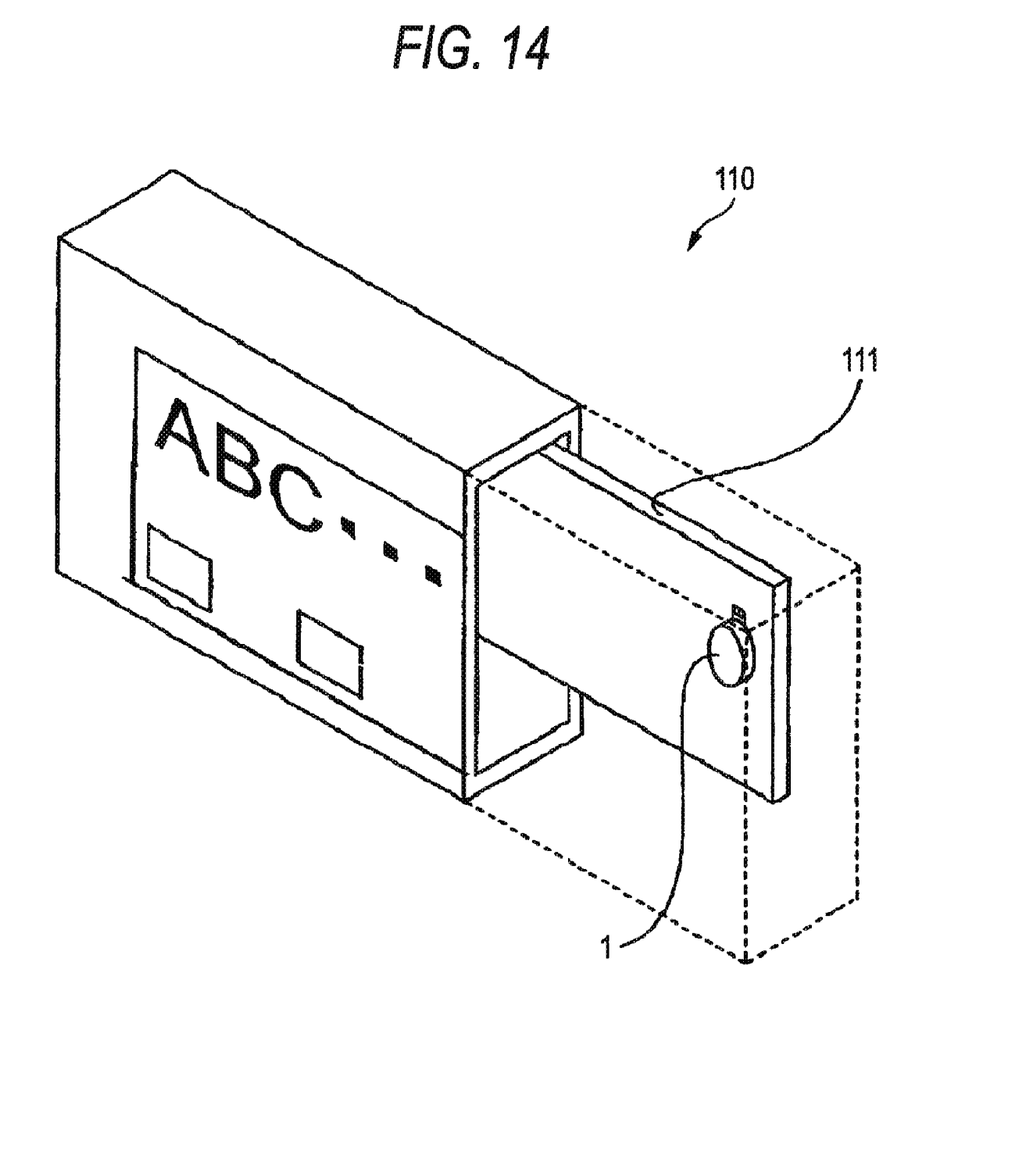
FIG. 14 is a perspective view showing a portable information terminal device having mounted a vibration motor according to an illustrative embodiment of the invention.
Figure 15:
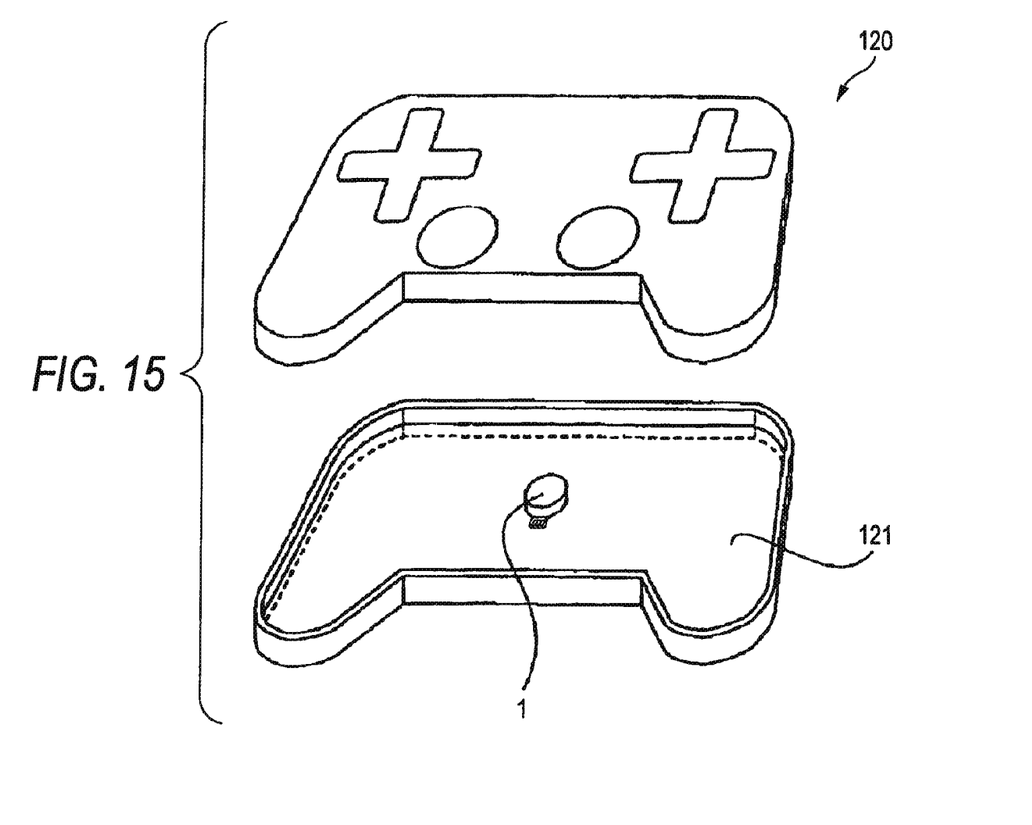
FIG. 15 is a perspective view showing a gaming device having mounted a vibration motor according to an illustrative embodiment of the invention.

The vibration motor according to the illustrative embodiment of the invention has been described. However, the vibration motor 1 in which the weight 50 is fixed to the salient poles 40a, 40b of the core 32 may be mounted to configure a variety of vibration notifying devices. As shown in FIG. 13, a portable communication device having a vibration notifying function can be formed by mounting that the vibration motor 1 in a case of a portable communication device, for example portable telephone 100 and connecting a circuit board 101 of the portable telephone 100 to the terminal 48 of the vibration motor 1. In addition, as shown in FIG. 14, a portable information terminal device having a vibration notifying function can be formed by mounting the vibration motor 1 in a case of a portable information terminal 110, for example PDA and portable digital player, and connecting a circuit board 111 of the portable information terminal device 110 to the terminal 48 of the vibration motor 1. Further, as shown in FIG. 15, a gaming device having a vibration notifying function can be formed by mounting the vibration motor 1 is mounted in a case of a gaming device 120, for example, a controller of the gaming machine, and connecting a circuit board 121 of the gaming device 120 to the terminal 48 of the vibration motor 1. The gaming device 120 may be a main body of a portable gaming device or a handle of a pachinko machine. These devices generate vibration by appropriately rotating the vibration motor, when a message is received, an operation is made or an operator touches a screen, or as a game is progressed.

The invention claimed is:

1. A vibration motor comprising:
   a core that includes a plurality of salient poles radially protruding from a center part thereof and rotates about a rotation axis line, each of the salient poles including a coil part on which a coil is wound and a wing part extending from an portion of the coil part in a circumferential direction; and
   a weight that is fixed to the salient pole,
   wherein the weight includes:
   first and second weight parts that extend along the wing parts to hold the adjacent wing parts therebetween so as to define an insertion part that is formed between the first and second weight parts and into which the adjacent wing parts are inserted in the radial direction of the core; and
   a third weight part that is inserted between the adjacent wing parts and connects the first weight part and the second weight part in a direction of the rotation axis line such that the insertion part is decoupled.

2. The vibration motor according to claim 1, wherein the weight includes an engagement part that connects the first weight part to the second weight part and is inserted into a recess part formed on a peripheral surface of the wing part.

3. The vibration motor according to claim 1, wherein the weight includes first and second clamping parts that are adjacent to the third weight part and protrude between the salient poles from the first and second weight parts.

4. The vibration motor according to claim 3, wherein the pair of first clamping parts are integrated with the third weight part to hold the third weight part from both sides of the third weight part and the pair of second clamping parts are opposed to the first clamping parts and spaced from the third weight part.

5. The vibration motor according to claim 4, wherein a riser part extending in a radial direction is inserted between the second clamping parts.

6. A vibration notifying device mounting the vibration motor according to claim 1.

7. A portable communication device mounting the vibration motor according to claim 1.

8. A portable information terminal device mounting the vibration motor according to claim 1.

9. A gaming device mounting the vibration motor according to claim 1.

* * * * *